United States Patent [19]

Pleyer

[11] Patent Number: 5,883,627
[45] Date of Patent: Mar. 16, 1999

[54] ADVANCED GRAPHICS CONTROLS

[75] Inventor: Sven Pleyer, Redmond, Wash.

[73] Assignee: Microsoft Corporation, Redmond, Wash.

[21] Appl. No.: 719,771

[22] Filed: Sep. 25, 1996

[51] Int. Cl.⁶ .................................................. G06T 11/00
[52] U.S. Cl. ......................... 345/348; 345/473; 345/977
[58] Field of Search ..................................... 345/430, 473, 345/977, 348

[56] References Cited

U.S. PATENT DOCUMENTS

| | | | |
|---|---|---|---|
| 4,615,013 | 9/1986 | Yan et al. | 345/430 |
| 5,557,684 | 9/1996 | Wang et al. | 382/107 |
| 5,592,605 | 1/1997 | Asuma et al. | 345/348 |

Primary Examiner—Mark K. Zimmerman
Attorney, Agent, or Firm—Lee & Hayes, PLLC

[57] ABSTRACT

A graphics control for an interactive user interface includes a plurality of individually specified graphics components. Each graphics component has non-transparent portions and potentially also has transparent portions. In one embodiment, the graphics components include a background component, a face component, a frame component, and a focus component. The components are overlaid on each other from bottom to top, creating a layered effect. The face component is selectable by the user input to perform an action, and selecting the face component changes the appearance of the face component. Other than the background component, the components each are constructed of a texture bitmap and one or more luminance bitmaps. The texture bitmaps are tiled to conserve memory and data bandwidth. The luminance bitmaps can be supplied in a small size, and scaled using a special tiling technique.

54 Claims, 5 Drawing Sheets

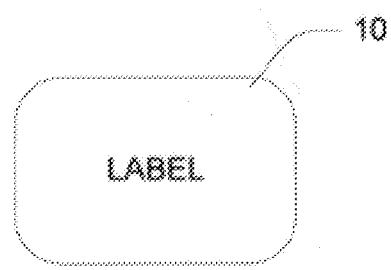
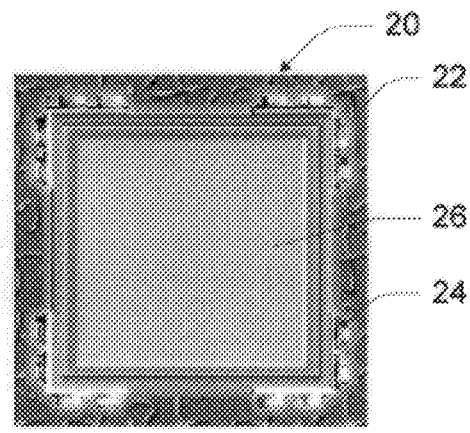
Fig. 1
Prior Art
Fig. 2
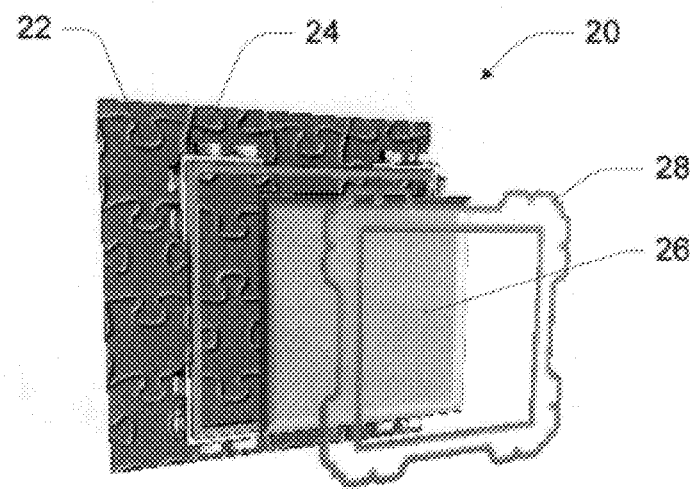
Fig. 3

ADVANCED GRAPHICS CONTROLS

TECHNICAL FIELD

This invention relates to graphics controls used on graphical user interfaces.

BACKGROUND OF THE INVENTION

Conventional computer programs commonly utilize graphical user interfaces having what are referred to as graphics "controls". A graphics control is a discrete visual object on the computer screen that can be manipulated by the user to perform an action in an associated application program.

Perhaps the most common controls are buttons, which allow a user to select options, and scroll bars, which allow the user to move through a document or position text in a window. An example of a button, as it commonly appears in popular graphical user interfaces, is shown in FIG. 1 generally designated by reference numeral 10. The button has a textual label that indicates the function of the button. The user can select the button by moving an on-screen pointer to the button and pressing a key such as a mouse key. When the button is selected, it changes its appearance momentarily. In some implementations, the button is made to appear as if it has actually been pressed. The application program interprets this selection as an instruction from the user, and performs the function indicated by the button's label.

A check box is another common type of control. A check box is simply an empty box. When the user selects the box, it is filled with a check mark or an "X" to indicate that the user has selected a corresponding option.

Other common types of controls include radio buttons, spin dials, list boxes, and text boxes. These graphics controls are widely used in the Microsoft Windows® programming environment, in which they can be conveniently implemented with operating system calls. For further information regarding such graphics controls, and for descriptions of how to implement and use such controls, refer to *Microsoft Windows* 3.1 *Guide to Programming*, Redmond, Wash.: Microsoft Press, 1987–1992, which is hereby incorporated by reference. The following discussion assumes a working familiarity with the use and programming of popular graphical user interfaces such as implemented in the Microsoft Windows® programming environment.

Currently existing graphics controls are functionally adequate in the common environment of a typical personal computer. However, the nature of computing devices is changing rapidly. In newer computing devices, existing forms of graphics controls may not be effective. As an example, many people believe that home computers will someday be supplanted by hybrid entertainment devices that integrate the functions of computers and televisions. As another example, it is likely that set-top boxes associated with cable television services will soon be required to implement much more sophisticated user interfaces as interactive services become available to cable subscribers.

The rapid growth of communications between computers is another development that is changing the nature of computing devices. Many people believe that the personal computer of today will soon be replaced by a much simpler and less expensive device whose main function will be to access the resources of an external network such as the Internet. Again, it is often envisioned that such a device will be integrated with other entertainment devices such as televisions.

These developments point to an apparent merging of television, video, and computer functions into a single device, in which a single user interface will be desirable.

However, existing graphics controls do not work well in the more "active" environments of the video and television worlds. In these environments, the user is continually presented with very colorful, unpredictable, and rapidly changing display screens. Conventional graphics controls are easily overlooked in these environments. Even in the Internet environment, where content providers often compete for audiences, more colorful and noticeable controls are desired.

Such colorful and noticeable graphics controls are available only at a relatively high price in public network environments—such as interactive television networks, online service networks, and the Internet—in which data bandwidth is at a premium. Creating a complex graphics control requires a lot of data, and in these environments such data must be transferred from a server to a client over connections that are often quite slow. Furthermore, a relatively simple client device such as a set-top box might have only limited storage capabilities, and might therefore be incapable of handling complex or lengthy data.

SUMMARY OF THE INVENTION

The invention described below provides a way for content developers and providers to provide custom controls that can be supplied over relatively slow communication channels and that can be utilized by unsophisticated computer devices.

A control is built in terms of graphic components that are overlaid on each other to form interesting composite images. An individual graphic component consists of a texture bitmap and a luminance bitmap. A texture bitmap is simply a graphical pattern, while a luminance bitmap is a gray-scale image that creates the illusion of depth or light/shadow. The luminance bitmap is combined with the texture bitmap to create interesting surfaces.

When creating a common family of controls, texture bitmaps can be shared between controls and between components of controls. Luminance bitmaps can also be reused within a client device. Re-sizing of controls is accomplished by using tiling techniques for texture bitmaps, and by scaling luminance bitmaps.

A typical control consists of a background component; a face component, which has two states to indicate whether it has been selected; a frame component surrounding the face component; and a focus component that indicates when the control has focus. Each of these components except the background comprises a luminance bitmap and a texture bitmap.

Animation is used in the graphics controls to provide emphasized feedback to a user. For example, the focus component comprises a plurality of bitmaps that are displayed cyclically when a graphics control has the focus.

BRIEF DESCRIPTION OF THE DRAWINGS

FIG. 1 shows a conventional graphics control such as used in the prior art.

FIG. 2 shows a graphics control in accordance with one embodiment of the invention.

FIG. 3 is an exploded perspective view of the graphics control of FIG. 2.

DETAILED DESCRIPTION OF THE PREFERRED EMBODIMENT

Figure 4:
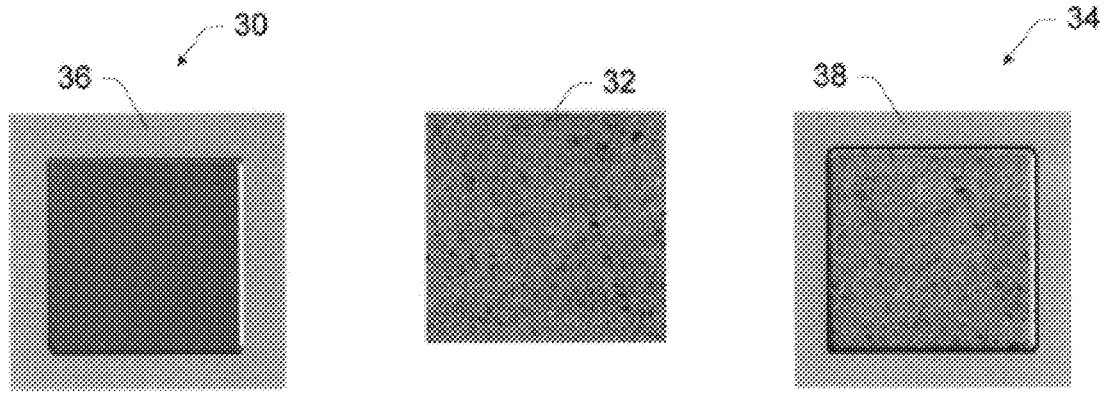
FIG. 4 shows elements of the face component of FIG. 2.

FIG. 2 shows a graphics control 20 in accordance with a preferred embodiment of the invention for display on a portion if an interactive user interface. Graphics control 20 can be used in any graphical user interface. However, it has particular advantages in "busy" or "active" environments such as interactive television and Internet web browsers, in environments where controls must compete for attention, and where they are downloaded from servers using limited data bandwidth.

One embodiment of the invention is indeed in a set-top box of an interactive cable television distribution system. The set-top box has an operating system with a variety of features similar to that of a modem operating system such as the Windows® family of operating systems available from Microsoft Corporation of Redmond, Wash. The operating system executes object-oriented programs and program modules, and supports ActiveX technology (formerly referred to as OLE—object linking and embedding). Different types of communications are available with the cable headend and with different types of computer servers at the headend. The set-top box has little or no non-volatile read/write memory, and has limited volatile read/write memory.

The user interface in this system is formed by a television and by a limited-function remote control unit. The user interface, however, might allow very complex functions such as, for example, performing complex queries against a database of available television programs and/or interactive movies.

Another embodiment of the invention is in an Internet web browser, typically operating on a desktop computer. Again, this computer has an operating system similar to the Windows® operating system. In this case, however, the user interface is the more usual keyboard, mouse, and high-resolution graphics display.

Alternatively, the Internet web browser might operate on a computer or computer-like device having much more limited local resources than a typical desktop computer. For instance, the computer might have no local mass storage, and very little electronic memory. Furthermore, an infrared remote control device might in some cases be the preferred input device. The web browser and the Internet content it renders for a user might be much more varied than is typical today, and might commonly include real-time or continuous-feed video and audio, similar to television and radio broadcasts. Indeed, the browser might be capable of receiving and displaying video and/or audio streams from a local tuner, and of treating those types of media just like any other content that is to be rendered for the user.

Graphics control 20 of FIG. 2 is an exemplary graphics control in the form of a button. Other types of controls can be implemented using the same techniques described below, including simple dialog boxes, check boxes, radio buttons, spin dials, list boxes, and text entry boxes. Furthermore, such controls can be placed over each other to present more complex input arrangements. For instance, various buttons, check boxes, and list boxes might be displayed over a dialog box, with the dialog box in turn overlying underlying multi-media content that is being rendered in conjunction with a set-top box or an Internet web browser.

Graphics control 20 has a plurality of individually specified graphics components, including a background component 22, a frame component 24, a face component 26, and a focus component (not easily visible in FIG. 2). Not all of these component are present in every control, and additional components might be present in other controls. As an example, a simple dialog box, on which other controls are placed, might include only a background component and a frame component. On the other hand, some controls, such as text entry boxes, might have arrow components that are selectable by the user to allow the user to scroll through textual content.

The components of graphics control 20 are identified and shown more clearly in FIG. 3. A frame component 24 is visible in FIG. 3. FIG. 3 also shows how a graphics control 20 is constructed. Generally, respective graphics components are overlaid on each other, in a predetermined sequence or order, to create a composite control image with a layered appearance. In this embodiment, the components are overlaid in the following order, from bottom to top: background component; frame component, face component, and focus component.

All of the graphics components occupy the same rectangular region on the user interface. However, it may be desired to customize the look of a control so that it does not have a rectangular shape. This can be accomplished by specifying transparent regions in the components of the graphics control. Each graphics component potentially has transparent and non-transparent regions or portions. When the components are overlaid on each other, the non-transparent portions of an upper graphics component obscure underlying portions of other, lower graphics components, while the transparent portions of the upper graphics component allows non-transparent portions of the underlying graphics components to remain visible.

Each graphics component potentially comprises a plurality of elements. In the preferred embodiment of the invention, each such element is either a texture bitmap or a luminance bitmap (luminance bitmaps are also referred to as "mask" bitmaps), comprising a two-dimensional array of pixel values. Each bitmap is rectangular and has the same pixel size, so that the respective graphics components and their bitmaps all overlay a common rectangular region of the interactive user interface. A particular graphics component, however, may have transparent portions, and may therefore appear non-rectangular to the user.

Background component 22 is the simplest element, comprising simply a texture bitmap that underlies the face component and the frame component. Background component 22 cannot be selected, manipulated, or changed by the user—its appearance stays the same regardless of how the control is manipulated. Note that the background component might comprise a video image in some embodiments of the invention.

Any bitmap or other graphics image can potentially be used for background component 22. In the preferred embodiment, background component 22 is provided as a texture bitmap. It does not have to be provided in the size of the actual graphics control. Rather, it can be a "tile" element or bitmap that is smaller than the graphics control, which is duplicated or tiled to cover the appropriate area. This allows a small bitmap to efficiently cover a large area, and to create a graphics component that has a larger rectangular area than the texture bitmap itself. The tiling of texture bitmaps always takes place with reference to a specified single point of origin relative to the entire user interface. Thus, the same tile elements, when used in different graphics controls, will align with each other and appear to be part of the same surface. This allows the background component of one control to "hide" on the background component of another control, so that the background component of the first control is does not even look like part of the control. For example, a button located over a dialog box could have the same background as the dialog box. In this case, the background of the button would look like part of the underlying dialog box.

FIG. 4 shows a more complex graphics component, comprising a luminance bitmap 30 and a texture bitmap 32 which are combined to create face component 26 in the form of a combined bitmap 34.

Texture bitmap 32 is a color two-dimensional pattern (displayed as gray-scale for purposes of this description) that, when displayed, looks like the face of an interesting material such as wood, stone, or metal. A texture bitmap, even when being used in components other than background components, is tiled as described above with reference to the background component. Thus, a texture bitmap may be specified as a texture tile element that is smaller than the actual graphics control. It is enlarged to the size of the graphics control by tiling or duplicating it, using a common point of origin relative to the underlying user interface. The size of the supplied tile element is up to the designer. The selection of size does have efficiency ramifications, however. A small tile element (16×16 pixels) takes up less memory and communications bandwidth than a larger tile (64×80 pixels).

Textures bitmaps can be created using popular paint programs. Most bitmaps used in the preferred embodiment of the invention are 8-bit palettized bitmaps, and every bitmap can use a different palette. The bitmaps are stored as ".BMP" files. Such files are very common in the Windows® computing environment. If high quality bitmaps are needed, higher pixel depths can be used, such as 16, 24, and 32 bits. Other graphics formats, such as GIF, JPEG, and others, can also be supported.

A texture can be though of as a repeating patterned swatch of cloth that can be seen through a shaded overlay, the luminance bitmap. The luminance bitmap, on the other hand, is a gray-scale two-dimensional pattern that determines the apparent outline and contours of the component, and can also add a three-dimensional appearance of depth to the texture. A luminance mask can have a variety of styles, such as three-dimensional, hand-drawn, and scanned.

In the preferred embodiments of the invention, luminance bitmaps have pixel values from an 8-bit luminance palette. A luminance bitmap can be created as a .BMP file using such a palette and a paint program that includes indexed color. In situations where the ultimate display quality is relatively low, it is desirable to optimize the 8-bit luminance values to a 4-bit format prior to actually using the luminance bitmaps. Run-length encoding or similar compression techniques can optionally be used to compress the luminance bitmaps.

In the example of FIG. 4, texture bitmap 32 looks like stone. Luminance bitmap 30 looks like the three-dimensional face of a button. The solid gray area 36 at the outside perimeter of luminance bitmap 30 indicates a color key region that is to be transparent in the actual graphics component. To create combined bitmap 34, luminance bitmap 32 is lined up with texture bitmap 30, and each pixel value of texture bitmap 30 is simply shaded in accordance with the corresponding gray-scale value of luminance bitmap 32. Luminance bitmaps have gray-scale values ranging from 0 to 255, where a value of '1' represents black, the value '255' represents white, and the value '127' represents a neutral shade. A value of '0' represents a transparent pixel.

Each color value of the texture bitmap is shaded (lighted or darkened) by a factor that is based on the corresponding luminance value in the luminance bitmap. If the luminance value is a neutral '127', the color value is not changed. If the luminance value is less than '127', the corresponding color value is darkened—the lower the luminance value, the more the color value is darkened. If the luminance value is greater than '127', the corresponding color value is lightened—the greater the luminance value, the more the color value is lightened. If the luminance value is '255', the corresponding color value is lightened all the way to white. If the luminance value is '1', the corresponding color value is darkened to black. If the luminance value is '0', the color value is changed to a key value that indicates transparency in the combined bitmap (area 38 in combined bitmap 34).

Figure 5:
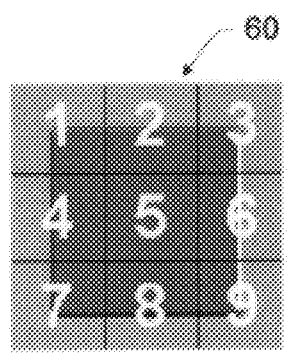
FIGS. 5 and 6 show how a luminance bitmap is scaled in accordance with the invention.
Figure 6:
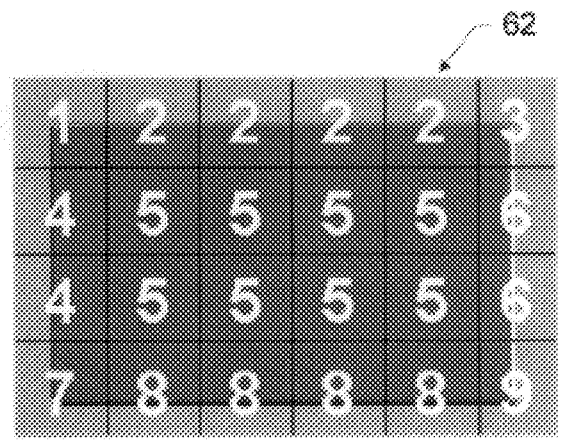

Any luminance elements can be provided in a small size, and enlarged to create a larger graphics component. This is accomplished by dividing a luminance bitmap into repeating and non-repeating regions. An example is shown in FIG. 5, where a luminance bitmap 60 for a frame component is divided into a 3×3 grid of nine rectangles, including a center region '5'; side regions '2', '4', '6', and '8'; and corner regions '1', '3', '7', and '9'. The rectangles are equal in size and shape. To enlarge this bitmap, the center and side regions are duplicated or tiled as necessary between the corner regions. Side regions remain along their respective sides of the component, while the corner regions or rectangles remain in the same relative corners and never tile or repeat. The center regions are tiled to fill the center of the component. FIG. 6 shows how the example luminance bitmap of FIG. 5 is enlarged to create an enlarged luminance bitmap 62 using this method.

In some cases, a single graphics component might have more than one luminance element. For example, a face component is usually selectable by user input to perform an action in an associated application program. It is desirable for the face component to change its appearance when selected. Often, it will be desired to make the face component appear as if it has been momentarily pushed in when selected. This is accomplished by providing two luminance bitmaps for the face component. The two luminance bitmaps are used alternatively with the same texture bitmap to indicate different control states. One luminance bitmap shows the face component in a non-selected or non-depressed state, while the other luminance bitmap shows the face component in a selected or depressed state.

Figure 7:
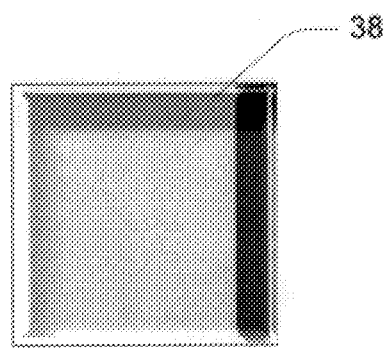
FIG. 7 shows a pair of luminance bitmaps such as might be used for a face component.
Figure 7:
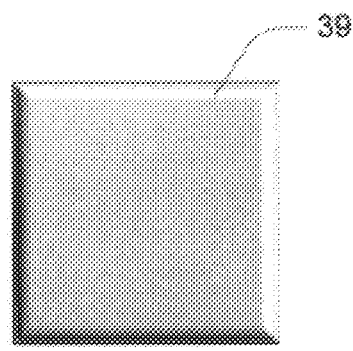

FIG. 7 shows two exemplary luminance bitmaps 38 and 39, to be used in a face component for selected and non-selected states, respectively. These bitmaps are combined with texture bitmap 32 to create the actual face elements that are displayed on the user interface.

Figure 8:
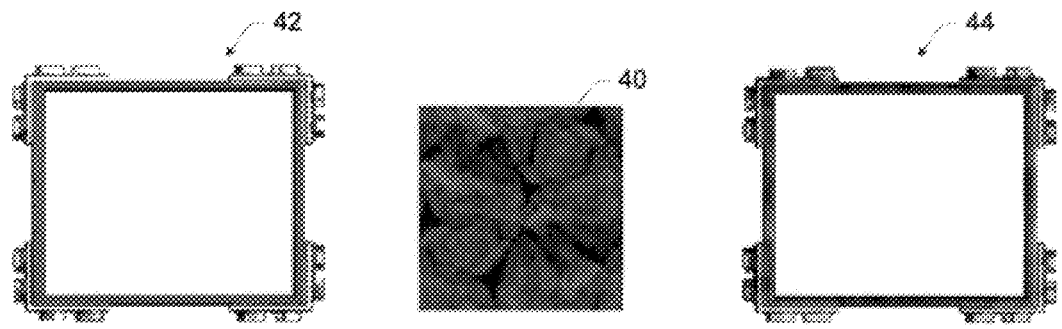
FIG. 8 shows elements of a frame component.

A frame component such as frame component 24 of FIGS. 2 and 3 is created by combining texture and luminance bitmaps, using the same procedure as already described above. FIG. 8 shows a texture bitmap 40, a luminance bitmap 42, and a resulting combined bitmap 44 representing frame component 24. Transparent areas are not specifically identified in this example, although they can be utilized as already described.

A frame component is slightly different than a face component in that it is not normally selectable by the user. The frame component is intended primarily as a visual object, to highlight or enhance the face component. Also, the frame component does not change its appearance in the preferred embodiment of the invention. Accordingly, frame component 24 has only a single luminance bitmap. Some graphics controls will have no frame component. Note, however, that in more complex embodiments of the invention it is possible to make any component selectable and to specify different sizes, positions, and bitmaps for different component states.

Focus component 28 of FIGS. 2 and 3 is displayed only when the graphics control is the subject of a focus. In a user interface, it is often necessary point out to a user which of multiple graphics controls is awaiting action. In other words, it is necessary to indicate that the user interface is expecting the user to manipulate a particular the graphics control. In this situation, the graphics control is said to have or to be the subject of the interface's focus.

In the conventional Windows® environment, the focus is typically indicated by a highlighted border around a control. It has been found, however, that this is somewhat difficult for a user to detect in a more "active" or low-resolution environment such as results in a user interface that is displayed over video—especially over television video. It is much easier to discern the focus if it is animated.

Figure 9:
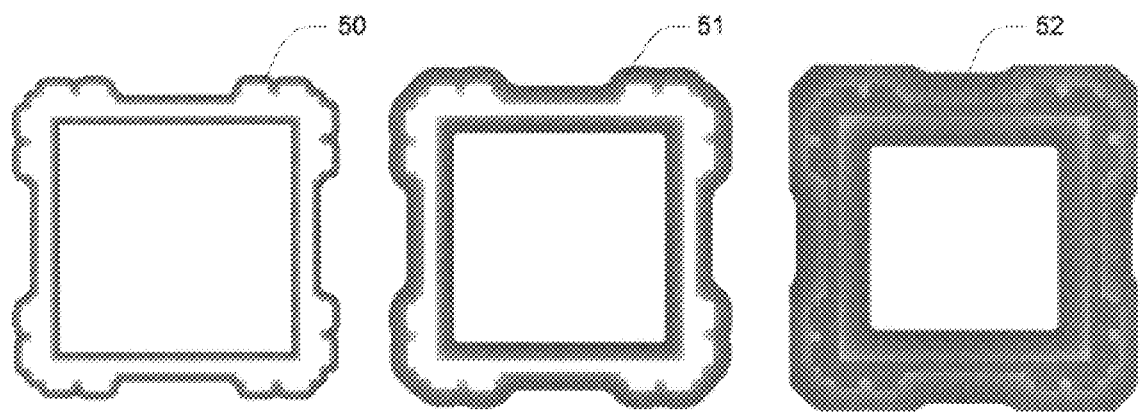
FIG. 9 shows a series of animation bitmaps in accordance with an embodiment of the invention.

FIG. 9 shows elements of focus component 28. Focus component 28 comprises a plurality of animation elements that are displayed cyclically when the graphics control is the subject of the interface's focus. In the embodiment shown, these elements include first, second, and third luminance bitmaps 50, 51, and 52. They are cycled from the first to the third bitmap, back to the first bitmap through the second bitmap, and so on, with a predetermined or variable timing on the order of milliseconds so that the transitions between animation elements appear fairly seamless to the user. The order and speed of frame animation can also be specified. The luminance bitmaps preferably include transparent areas or portions. More than three elements can be provided and cyclically displayed to improve the animation effect.

The focus component is overlaid on top of the other graphics components, and the luminance bitmaps of the focus component are combined and displayed in combination with visible portions of underlying components to shade those components in accordance with the shading scheme described above. Again, transparent portions of the focus component bitmaps do not effect the underlying components.

In other embodiments of the invention, each animation element comprises a texture bitmap and a luminance bitmap, which are combined as described above and simply overlaid in sequence on the background, frame, and face components.

Animation is also desirably utilized in conjunction with the face component and other components that indicate state changes. Specifically, such components can include a plurality of animation elements or bitmaps that are displayed in sequence to indicate a transition between different control states of the face component or graphics control. These animation elements preferably comprise a series of luminance bitmaps that are combined with a single texture bitmap of the face component during the animation.

Figure 10:
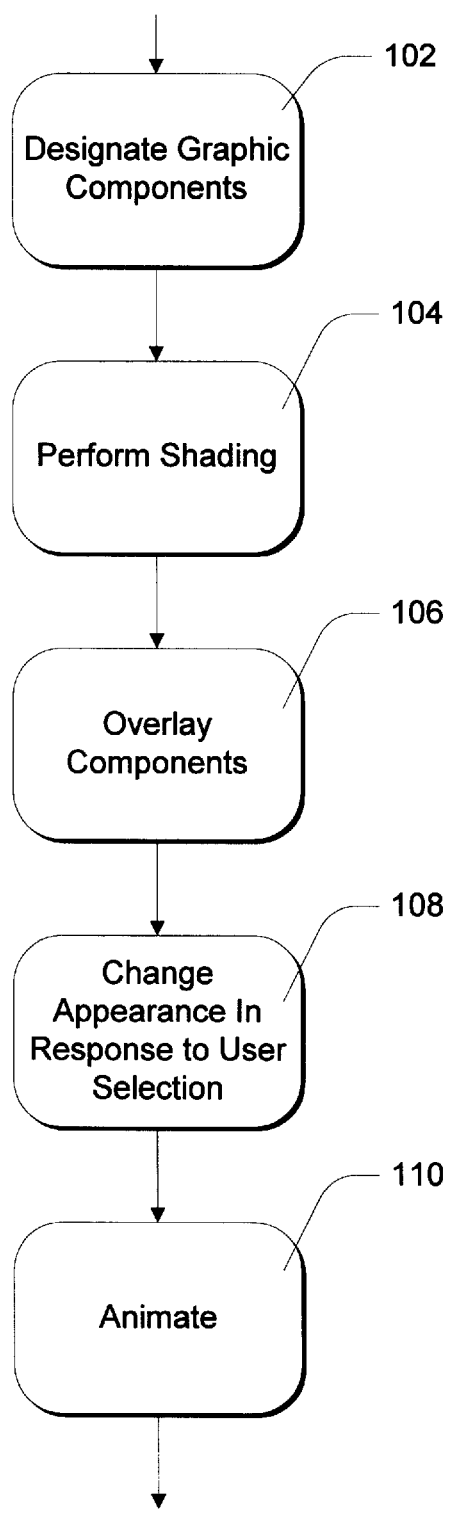
FIG. 10 shows preferred methodological steps in accordance with the invention.

FIG. 10 shows preferred steps in displaying a graphics control in accordance with the invention. A step 102 comprises designating a plurality of graphics components. Each graphics component is potentially designated in terms of a luminance element and a texture element. Furthermore, individual graphics components might have a plurality of luminance and/or texture bitmaps to be used for animation and/or to indicate changes in control states.

A step 104 comprises, for an individual graphics component, shading the texture element based on the luminance element to create the graphics component; more specifically, to create a bitmap representing the graphics component.

A step 106 comprises overlaying a plurality of graphics components on each other in a pre-determined order to create a composite control image, wherein non-transparent portions of an overlaying or upper component obscure underlying portions of an underlying or lower component.

A step 108 comprises changing the appearance of at least one of the graphics components of the composite control image in response to a user selecting one of the graphics components. This step typically involves the face component, which changes appearance when selected by the user. This change in appearance is preferably accomplished by alternating the luminance bitmap used for the face element, while using the same texture bitmap. In addition, this step optionally includes a step of sequentially or cyclically displaying a plurality of animation elements or bitmaps, to create an animation effect that draws attention to the graphics control during the transition between the starting and ending appearances of the face component.

A further step 110 comprises providing a plurality of animation elements or bitmaps to be used in a focus component, and cyclically displaying the animation elements when the graphics control is the subject of the focus. Such bitmaps can be luminance bitmaps or the combination of luminance and texture bitmaps.

Figure 11:
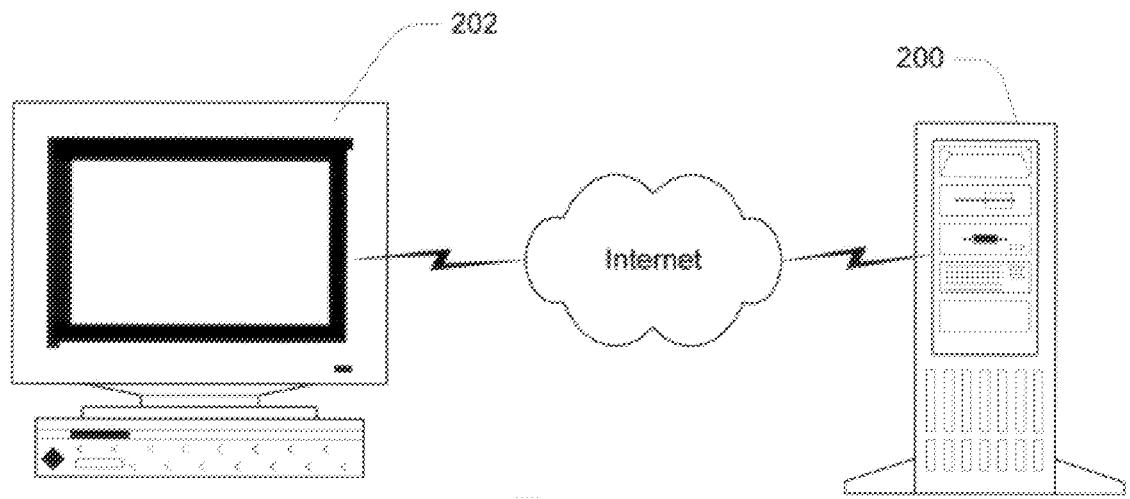
FIG. 11 shows a typical network system in accordance with an embodiment of the invention.

The invention is embodied in a system such as shown in FIG. 11, which includes one or more server computers 200 and one or more client devices 202, connected by some form of networking or other data communications media such as the Internet. Each client device is, in this embodiment, a personal computer of some type running an Internet web browser from some form of computer-readable memory such as internal electronic memory, magnetic-based mass storage, or optical-based mass storage. The memory is programmed to implement the steps described above. In other embodiments, the client device might be a television set-top box or other types of device having the ability to communicate with server computer 200 and to respond to instructions from server computer 200.

The web browser of client computer 202 is programmed to respond to commands from a server computer 200 to display controls such as described above. To display a particular graphics control, server computer 200 issues an appropriate command, followed by an identification of data that is to be used to construct the graphics control. As described above, such data comprises a number of elements for each component of the graphics control. Some components, like the background component, require only a single component (a tile bitmap). Other components require a plurality of elements. The face component, for example, requires a luminance bitmap and a texture bitmap, and might also include additional luminance bitmaps for indicating control states and for animation.

Once a particular graphics element has been downloaded to client computer 202, it can be reused without downloading it again. For example, it might be desired to use the same background for all graphics controls in a particular application. A single tile element can be downloaded once, and used again and again by multiple graphics controls, being tiled each time to an appropriate size. To allow this, each graphics element is assigned an identifier or pointer when it is downloaded, and referenced in the future by that same identifier or pointer as the server computer creates new graphics controls.

Similarly, frame components, face components, and focus components can be reused and shared between graphics components, even on controls of different sizes, due to the feature described above of enlarging luminance bitmaps by dividing them and tiling their repeating portions. Luminance bitmaps are similarly specified by an identifier or pointer.

The invention thus includes a method of displaying a plurality of graphics controls, comprising the steps described above and particularly with reference to FIG. 10, and the further step of using common bitmaps in different graphics controls.

Figure 12:
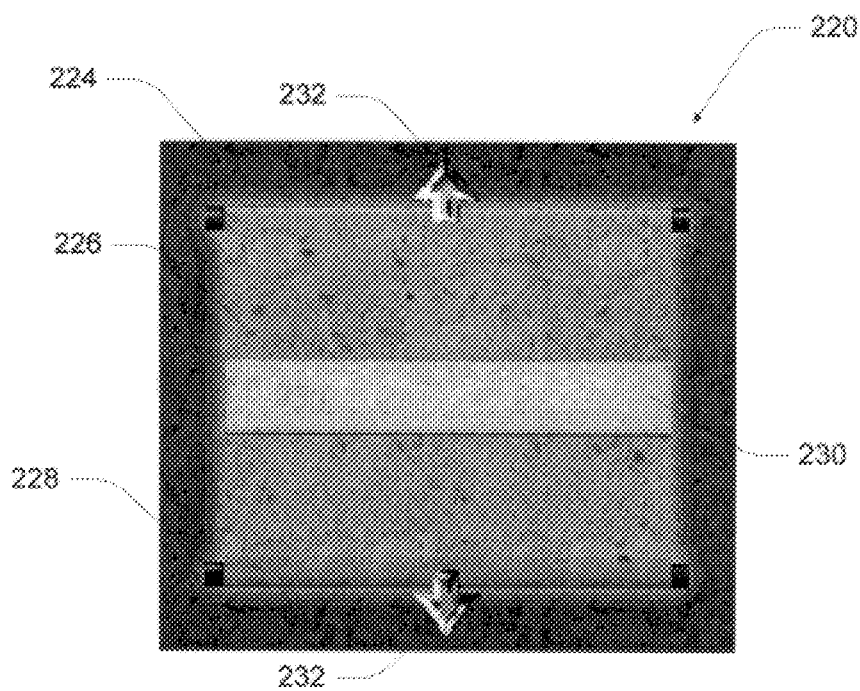
FIG. 12 shows a text box implemented in accordance with the steps of FIG. 10.

FIG. 12 shows an example of a text box 220 in accordance with the invention. Text box 220 includes a background component 224, a face component 226, a frame component 228, a highlight component 230, and arrow components 232. In this case, it is the arrow elements that are selectable by a user to scroll through text that is presented on face element 226. A particular line of the text is highlighted by highlight element 230. Face element 226 is not selectable.

Background component 224, face component 226, and frame component 228 are constructed as described above except that the face component includes only a single texture bitmap and a single luminance bitmap, since its appearance is not required to change. Highlight element 230 is preferably a single luminance bitmap, which is overlaid on the face component with shading. That is, the luminance element is used to shade the underlying face component. The highlight component moves up and down over the face component in response to a user's manipulation of arrow components 232.

Arrow components 232 are formed from both luminance and texture bitmaps. In addition, alternate luminance bitmaps are provided for each arrow, and are used to indicate when an arrow has been selected.

The invention allows complex and visually interesting graphics controls to be constructed with only a minimum of memory and data bandwidth. Regardless of the desired size of a control, each of its luminance bitmaps is always a 3×3 rectangular bitmap that uses a comparatively small amount of memory, even though it may occupy a lot of screen space. Because background and other component textures are really tiled surfaces, they also use little of memory. Because of this:

A control can be scaled to any size without adding memory or bandwidth cost.

A group of controls can all reference the same tile element for textures, again reducing memory and bandwidth requirements. This also helps to create a suite of controls with a consistent look, improving user understanding.

The elements of graphics components can be further reduced in size by using appropriate data compression techniques.

Focus can be easily animated and customized.

Applications at the client end do not have to continually store or download new bitmaps.

While the look of the controls is versatile, they can all use the same engine and therefore work the same way.

It is envisioned that the availability of controls such as described above will provide much more interesting and effective user interfaces.

In compliance with the statute, the invention has been described in language more or less specific as to structural and methodological features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A graphics control for display on an interactive user interface, comprising:

a plurality of individually specified graphics components;

wherein respective graphics components are overlaid on each other on the interactive user interface in a predetermined order to create a composite control image; and wherein at least one of the graphics components comprises a face component that is selectable by the user to change the appearance of the graphics control; and wherein at least another of the graphic components comprises a frame component that is not selectable by the user.

2. A graphics control as recited in claim 1, wherein an individual graphics component comprises a texture element and a corresponding luminance element, the texture element and luminance element being combined to form said individual graphics component.

3. A graphics control as recited in claim 1, wherein an individual is graphics component comprises a texture bitmap and a corresponding luminance bitmap, the texture bitmap and luminance bitmap being combined to form said individual graphics component.

4. A graphics control as recited in claim 1, wherein at least one of the graphics components comprises a texture element and a corresponding luminance element, the texture element and luminance element being combined to form said at least one of the graphics components, wherein the texture element is tiled to create a graphics component that has a larger area than the texture element itself.

5. A graphics control as recited in claim 1, wherein an individual graphics component comprises a texture bitmap and a corresponding luminance bitmap, the texture bitmap being tiled and combined with the luminance bitmap to form said individual graphics component.

6. A graphics control as recited in claim 1, wherein the graphics components include at least two face elements that are displayed alternatively on the interactive user interface to indicate different control states.

7. A graphics control as recited in claim 1, wherein:

the graphics components include at least two face elements that are displayed alternatively on the interactive user interface to indicate different control states;

the graphics components further include a plurality of animation elements that are displayed in sequence on the interactive user interface to indicate a transition between the different control states, the animation elements being displayed in combination with the other graphics components of the graphics control.

8. A graphics control as recited in claim 7 wherein each of the animation elements comprises a luminance element.

9. A graphics control as recited in claim 7 wherein each of the animation elements comprises a luminance bitmap.

10. A graphics control as recited in claim 1, wherein the graphics components include a plurality of animation elements that are displayed cyclically on the interactive user interface, the animation elements being displayed in combination with the other graphics components of the graphics control.

11. A graphics control as recited in claim 10, wherein each of the animation elements comprise a texture bitmap and a corresponding luminance bitmap.

12. A graphics control as recited in claim 1, wherein:
the respective graphics components overlay a common rectangular region of the interactive user interface;
individual graphics components have portions that are transparent, thereby allowing non-transparent portions of underlying graphics components to remain visible.

13. A graphics control for display on a portion of an interactive user interface and for manipulation by a user to perform an action, wherein the graphics control is potentially the subject of a focus, the focus indicating that the interactive user interface is expecting the user to manipulate the graphics control, comprising:
a plurality of individually specified graphics components, each graphics component having non-transparent portions;
wherein respective graphics components are displayed over each other in a sequence on a common region of the interactive user interface to create a composite control image, the non-transparent portions of an individual graphics component obscuring underlying portions of other graphics components;
at least one of the graphics components being selectable by the user to change the appearance of the graphics control;
wherein said at least one of the graphics components that is responsive to user input comprises a face component that is selectable by the user to change the appearance of the graphics control; and
wherein at least another of the graphics components comprises a frame component that is not selectable b the user.

14. A graphics control as recited in claim 13, wherein the graphics components comprise bitmaps.

15. A graphics control as recited in claim 13, wherein the graphics components comprise texture bitmaps and luminance bitmaps.

16. A graphics control as recited in claim 13, wherein individual graphics components have transparent portions, thereby allowing non-transparent portions of underlying graphics components to remain visible.

17. A graphics control as recited in claim 13, wherein an individual graphics component comprises an element that is tiled to create a graphics component that has a larger area than said element itself.

18. A graphics control as recited in claim 13, wherein at least one of the graphics components comprises a texture element and a corresponding luminance element, the texture element and luminance element being combined to form said at least one of the graphics components, wherein the texture element is tiled to create a graphics component that has a larger area than the texture element itself.

19. A graphics control as recited in claim 13, wherein said at least one of the graphics components that is selectable includes at least two face elements that are displayed alternatively on the interactive user interface to indicate different control states.

20. A graphics control as recited in claim 13, wherein said at least one of the graphics components that is selectable includes at least two face elements that are displayed alternatively on the interactive user interface to indicate different control states, the face elements being responsive to user selection to change between said control states.

21. A graphics control as recited in claim 13, wherein:
said at least one of the graphics components that is responsive to user input includes at least two face elements that are displayed alternatively on the interactive user interface to indicate different control states;
said at least one of the graphics components that is responsive to user input further includes a plurality of animation elements that are displayed in sequence to indicate a transition between the different control states, the animation elements being displayed in combination with the other graphics elements of the graphics control.

22. A graphics control as recited in claim 13, wherein the graphics components include a focus component that is displayed when the graphics control is the subject of the focus.

23. A graphics control as recited in claim 13, wherein the graphics components include a focus component that is displayed when the graphics control is the subject of the focus, the focus component comprising a plurality of animation elements that are displayed cyclically when the graphics control is the subject of the focus.

24. A graphics control as recited in claim 23 wherein each animation element comprises a luminance element that is displayed by combining it with underlying portions of the other graphics elements of the graphics control.

25. A graphics control as recited in claim 23 wherein each animation element comprises a luminance bitmap.

26. A graphics control as recited in claim 23 wherein each animation element comprises a texture element and a corresponding luminance element, the texture element and luminance element being combined to form the animation elements.

27. A graphics control as recited in claim 13, wherein the graphics components include a background component, the background component comprising a tile element that is tiled to create a background component having a larger area than the tile element itself.

28. A graphics control as recited in claim 13, the graphics components including:
a background component that is not selectable by the user, the background component underlying the face component and the frame component.

29. A graphics control as recited in claim 13, the graphics components including:
a background component that is not selectable by the user, the background component underlying the face component and the frame component;
a focus component that is displayed when the graphics control is the subject of the focus.

30. A graphics control for display on a portion of an interactive user interface and for manipulation by a user to perform an action, wherein the graphics control is potentially the subject of a focus, the focus indicating that the interactive user interface is expecting the user to manipulate the graphics control, comprising:
a plurality of individually specified graphics components, each graphics component having non-transparent portions;
the graphics components including a face component that is selectable by the user input to perform an action, wherein selecting the face component changes the appearance of the graphics control;

the graphics components further including a frame component that is not selectable by the user;

wherein respective graphics components are overlaid on each other in a sequence on a common region of the interactive user interface to create a composite control image, the non-transparent portions of an individual graphics component obscuring underlying portions of other graphics components;

the face component and the frame component each comprising a texture bitmap and a corresponding luminance bitmap.

31. A graphics control as recited in claim 30, wherein the graphics components further comprise a background bitmap that underlies both the face component and the frame component.

32. A graphics control as recited in claim 30, wherein the graphics components further comprise a background bitmap that underlies both the face component and the frame component, wherein the background bitmap comprises a tile bitmap that is tiled to create the background bitmap.

33. A graphics control as recited in claim 30, wherein an individual texture bitmap is tiled to create a graphics component having an area larger than that of the individual texture bitmap.

34. A graphics control as recited in claim 30, wherein the graphics components further comprise a focus component that is displayed when the graphics control is the subject of the focus.

35. A graphics control as recited in claim 30, wherein the graphics components further comprise a focus component that is displayed when the graphics control is the subject of the focus, the focus component comprising a plurality of bitmaps that are displayed cyclically when the graphics control is the subject of the focus.

36. A graphics control as recited in claim 30, wherein the graphics components further comprise a focus component that is displayed when the graphics control is the subject of the focus, the focus component comprising a plurality of luminance bitmaps that are displayed cyclically when the graphics control is the subject of the focus.

37. A graphics control as recited in claim 30, wherein the face component comprises at least two luminance bitmaps that are displayed alternatively to indicate different control states.

38. A graphics control as recited in claim 30, wherein at least one of the graphics components comprises a plurality of bitmaps that are displayed sequentially to animate the graphics control.

39. A method of displaying a graphics control on a portion of an interactive user interface, comprising the following steps;

overlaying a plurality of graphics components on each other in a pre-determined order to create a composite control image;

changing the appearance of at least one of the graphics components of the composite control image in response to a user selecting one of the graphic components;

wherein at least another of the graphics components comprises a frame component that is not selectable by the user.

40. A method of displaying a plurality of graphics controls comprising the steps recited in claim 39, and further comprising a step of sharing graphics elements between graphics controls.

41. A method of displaying a plurality of graphics controls comprising the steps recited in claim 39, wherein each graphics component comprises one or more bitmaps, the method further comprising a step of using common bitmaps in different graphics controls.

42. A method of displaying a plurality of graphics controls comprising the steps recited in claim 39, wherein each graphics component comprises a texture bitmap and a luminance bitmap, the method further comprising a step of using common texture bitmaps in different graphics controls.

43. A method as recited in claim 39, wherein the graphics components includes a focus component that is displayed when the graphics control is the subject of a focus, the focus component having a plurality of animation elements.

44. A method as recited in claim 39, further comprising a step of sequentially displaying a plurality of animation elements when changing the appearance of said at least one of the graphics components.

45. A method as recited in claim 39, further comprising the following additional steps:

designating, for an individual graphics component, a texture element and a luminance element;

shading the texture element based on the luminance element to create said individual graphics component.

46. A method of displaying a graphics control on a portion of an interactive user interface, comprising the following steps; overlaying a plurality of graphics components on each other in a pre-determined order to create a composite control image;

changing the appearance of at least one of the graphics components of the composite control image in response to a user selecting one go the graphic components;

dividing at least an element of the graphics component into repeating and non-repeating regions;

duplicating one or more of the repeating regions to enlarge the graphics component.

47. A method of displaying a graphics control on a portion of an interactive user interface, comprising the following steps;

overlaying a plurality of graphics components on each other in a pre-determined order to create a composite control image;

changing the appearance of at least one of the graphics components of the composite control image in response to a user selecting one of the graphic components;

dividing at least an element of the graphics component into center, side, and corner regions;

duplicating center and side regions between the corner regions to enlarge the graphics component.

48. A computer-readable memory storing a computer program comprising:

instructions for overlaying a plurality of graphics components on each other in a pre-determined order to create a composite control image;

instructions for changing the appearance of at least one of the graphics components of the composite control image in response to a user selecting one of the graphic components;

wherein at least another of the graphics components comprises a frame component that is not selectable by the user.

49. A method of displaying a graphics control on a portion of an interactive user interface, comprising the following steps;

overlaying a plurality of graphics components on each other in a pre-determined order to create a composite control image;

changing the appearance of at least one of the graphics components of the composite control image in response to a user selecting one of the graphic components;

designating, for an individual graphics component, a texture element and a luminance element;

shading the texture element based on the luminance element to create said individual graphics component;

dividing the luminance element of said particular graphics component into repeating and non-repeating regions;

duplicating one or more of the repeating regions to enlarge the luminance element.

50. A method as recited in claim 49, further comprising:

tiling the texture element of said particular graphics component.

51. A method of displaying a graphics control on a portion of an interactive user interface, comprising the following steps;

overlaying a plurality of graphics components on each other in a pre-determined order to create a composite control image;

changing the appearance of at least one of the graphics components of the composite control image in response to a user selecting one of the graphic components;

designating, for an individual graphics component, a texture element and a luminance element wherein the texture and luminance elements are bitmaps;

shading the texture element based on the luminance element to create said individual graphics component;

dividing the luminance element of said particular graphics component into center, side, and corner region bitmaps;

duplication center and side region bitmaps of the luminance element between corner region bitmaps of the luminance element to enlarge the luminance element.

52. A method as recited in claim 51, further comprising:

tiling the texture element bitmap of said particular graphics component.

53. A computer-readable memory storing a computer program comprising;

instructions for overlaying a plurality of graphics components on each other in a pre-determined order to create a composite control image;

instructions for changing the appearance of at least one of the graphics components of the composite control image in response to a user selecting one of the graphic components;

instructions for designating, for an individual graphics component, a texture element and a luminance element wherein the texture and luminance elements are bitmaps;

instructions for shading the texture element based on the luminance element to create said individual graphics component;

instructions for dividing the luminance element of said particular graphics component into center, side, and corner region bitmaps;

instructions for duplicating center and side region bitmaps of the luminance element between corner region bitmaps of the luminance element to enlarge the luminance element.

54. A computer-readable memory storing a computer program comprising:

instructions for overlaying a plurality of graphics components on each other in a pre-determined order to create a composite control image;

instructions for changing the appearance of at least one of the graphics components of the composite control image in response to a user selecting one of the graphic components;

wherein at least another of the graphics components comprises a frame component that is not selectable by the user;

instructions for designating, for an individual graphics component, a texture element and a luminance element;

instructions for shading the texture element based on the luminance element to create said individual graphics component.

* * * * *